Sept. 1, 1959  L. C. THAYER ET AL  2,902,639
APPARATUS FOR THE MEASUREMENT OF FLUID CONDUCTIVITY
Filed March 21, 1955
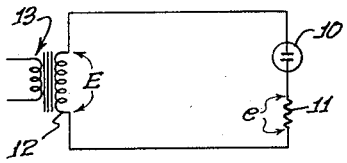
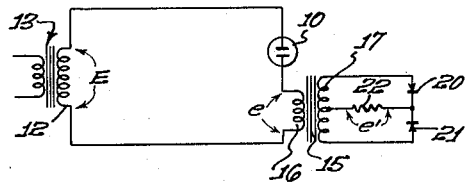
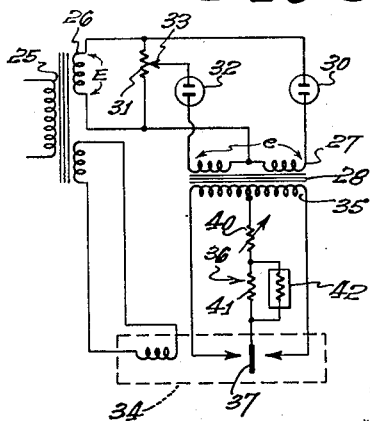
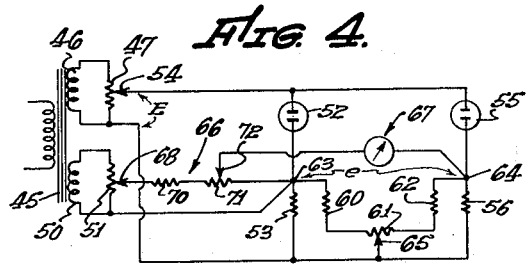
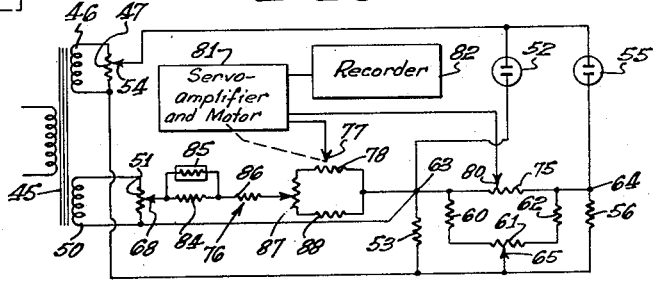
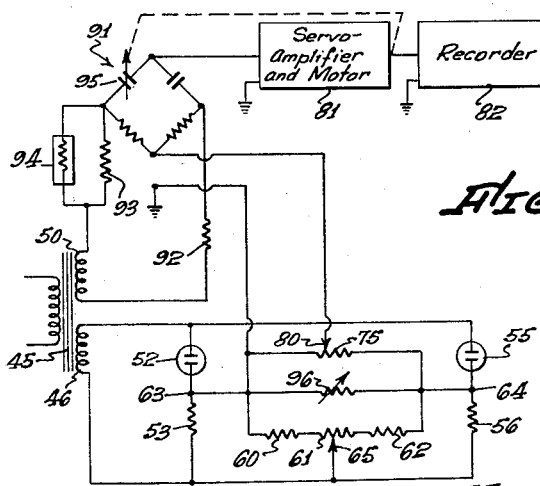
LOUIS C. THAYER,
MALBONE W. GREENE,
INVENTORS.
By THEIR ATTORNEYS
HARRIS, KIECH, FOSTER & HARRIS.

United States Patent Office 2,902,639
Patented Sept. 1, 1959

2,902,639

APPARATUS FOR THE MEASUREMENT OF
FLUID CONDUCTIVITY

Louis C. Thayer, Duarte, and Malbone W. Greene, Pasadena, Calif., assignors, by mesne assignments, to Beckman Instruments, Inc., Fullerton, Calif., a corporation of California Application March 21, 1955, Serial No. 495,681

16 Claims. (Cl. 324—30)

This invention relates to a method and apparatus for the measurement of the conductivity of a liquid, and, furthermore, to such a method and apparatus that is adapted to the measurement of the difference in conductivity of two or more liquids.

In the measurement of the electrical conductivity of liquids, especially of electrolytes in water, it is the usual practice to apply an alternating current potential across a Wheatstone bridge arrangement in which one arm thereof is a sample of the liquid to be measured contained between parallel plate electrodes. A telephone receiver or other null detector is used to balance the bridge by the usual impedance bridge method. From the measured resistance or conductance and the geometric constants of the cell, the conductivity of the liquid may be computed. The adjustable resistor of the bridge may be calibrated to read directly in conductance if various additional adjustments are provided to compensate for variations in cells and the effects of temperature. The principal disadvantages of this method are the reciprocal relationship between resistance and conductance and the calibration of the adjustable resistor and the necessity of manual balancing of the bridge in order to obtain a reading.

It is an object of the invention to provide a conductivity measuring method and apparatus in which the conductance of the liquid sample may be determined at any time without the necessity of balancing a bridge or adjusting a variable component to a null indication.

It is another object of the invention to provide a conductivity measuring method and apparatus which does not employ a bridge circuit and one in which there is a linear relation between the measured characteristic and the conductance of the sample.

It is another object of the invention to provide a conductivity measuring method and apparatus which will measure the difference in conductance between two liquids and provide an indication which is a linear function of the difference.

It is a further object of the invention to provide a conductivity difference measuring method and apparatus in which a voltage representative of the difference in conductance is compared with a second voltage which is energized from the same source as the measuring apparatus whereby the accuracy of the apparatus is independent of voltage source fluctuations.

An object of the invention is to provide a conductivity difference measuring method and apparatus in which the output of the apparatus has a linear relation with the difference in conductance and is independent of the actual conductivity of the liquid and of the temperature of the liquid.

The invention also comprises novel details of construction and novel combinations and arrangements of parts, which will more fully appear in the course of the following description. However, the drawings merely show and the description merely describes preferred embodiments of the present invention which are given by way of illustration or example only.

In the drawings:

Fig. 1 is a schematic diagram of one embodiment of the conductance measuring circuit of the invention;

Fig. 2 is a schematic diagram of another embodiment of the conductance measuring circuit of the invention;

Fig. 3 is a schematic diagram of one embodiment of a conductance difference measuring circuit;

Fig. 4 is a schematic diagram of another embodiment of a conductance difference measuring circuit.

Fig. 5 is a schematic diagram of an embodiment of the invention utilizing a servo rebalance unit to provide a continuous indication of a difference in conductance; and Fig. 6 is a circuit diagram of another embodiment of the invention utilizing a servo rebalance unit.

In the circuit of Fig. 1, a liquid conductivity cell 10 is connected in series with a resistor 11 across a secondary winding 12 of a transformer 13, the primary winding of the transformer 13 being connected to a suitable power supply, not shown. A sample of the liquid whose conductivity is to be determined is placed in the conductivity cell 10 and the resistor 11 is selected so that its conductance is very large in comparison with the conductance of the cell containing the liquid. The ratio of the conductance of the resistor to the conductance of the cell should be at least 20:1 and should preferably be in the range of 100:1 to 1000:1. When this condition exists, the conductance, G, of this cell and its contents are very nearly equal to the voltage, e, across the resistor 11 divided by the voltage, E, applied to the series combination of the cell and resistor times the resistance, R, of the resistor, that is:

$$G = \frac{e}{ER}$$

For example, when the ratio is 1000:1, the error in conductance measurements is in the order of 0.2%. Thus, it is seen that the conductance of the cell 10 is substantially directly proportional to the voltage across the resistor 11 when the output of the transformer 13 is a constant and therefore the conductivity of the liquid in the cell 10 may be read directly from a voltage measuring device connected across the resistor 11, the conductivity of the liquid being equal to the measured conductance divided by the cell constant.

A transformer 15 (Fig. 2) operating as a circuit transformer, may be substituted for the resistor 11 of Fig. 1, the primary winding 16 of the transformer being connected in series with the conductivity cell 10. A suitable load resistor may be connected across the secondary winding 17 of the transformer, or the output of the transformer may be rectified producing a direct current voltage indication. In the circuit of Fig. 2, serially connected rectifiers 20, 21 are connected across the ends of the secondary winding 17 and a load resistor 22 is connected between the junction point of the rectifiers 20, 21 and a center tap on the secondary winding 17. The voltage, $e'$, appearing across the load resistor 22 is related to the voltage, $e$, at the primary 16 of the transformer by the turns ratio of the transformer, hence the linear relation between the conductance of the cell 10 and the measured voltage across the load resistor is maintained.

The use of the transformer of Fig. 2 is advantageous in that it permits the resistance of the load resistor to be increased without affecting the linear relationship of the measuring circuit, thereby reducing the problems involved in the provision of low value resistors and in the measurement of very low voltages.

An embodiment of the invention utilizing two conductivity cells to provide a measurement of the difference in conductivity between two liquids is illustrated in Fig. 3. Therein, a transformer 25 has its primary connected to a suitable electric power source, not shown, and one end of a secondary winding 26 connected to the center tap of a primary winding 27 of another transformer 28. A conductivity cell 30 is connected intermediate the other end of the secondary winding 26 and one end of the primary winding 27. A potentiometer 31 is connected across the secondary winding 26 and a second conductivity cell 32 is connected intermediate an arm 33 of the potentiometer 31 and the other end of the primary winding 27. The potentiometer 31 provides a means for adjusting the voltage applied to the cell 32 to obtain equal outputs from the cells 30 and 32 when identical liquids are in the cells.

From the above relation it is seen that the difference in conductance is indepedent of the actual conductance of the liquids. This feature is advantageous when the conductance of a liquid is being determined before and after some treatment. The difference in conductance will be a measure of the amount of treatment taking place and it is desirable that the accuracy of the measurements not be affected by the actual conductivity of the liquid which fluctuates widely. In the embodiment described, a 500% increase in the conductance of the liquid in the cells will affect the accuracy of the difference in conductance measurement by only 2% when the ratio of the conductances of the load and cell is 500:1.

When the impedance coupled in series with the cells 30 and 32 by the transformer 28 is very small; that is, when the conductance of the load in series with the cells is large compared to the conductance of the cells, the desired linear relation between voltage across the load and conductance of the cell will be obtained. The relative values for the conductances are the same as those discussed previously. Under these conditions, the following relation is obtained:

$$G_1 - G_2 = \frac{e}{ER}$$

where $e$ is the difference between the voltages developed in the two halves of the primary winding 27, $E$ is the voltage of the secondary winding 26, $R$ is the equivalent resistance of the load connected in series with the cell 30, $G_1$ is the conductance of the cell 30 and its contents, and $G_2$ is the conductance of the cell 32 and its contents.

The secondary circuit of the transformer 28 of Fig. 3 is similar to that of the transformer 15 of Fig. 2. A vibrator rectifier 34 is connected across a secondary winding 35 of the transformer 28 and a load 36 is connected between the center tap of the secondary winding 35 and the moving arm 37 of the vibrator rectifier 34. The load 36 consists of a variable resistor 40 serially connected to a parallel combination consisting of a resistor 41 and a compensation resistor 42. The variable resistor 40 provides an adjustment for controlling the sensitivity of the circuit and the compensation resistor 42 provides compensation for variations in the temperature of the liquid being measured. The resistor 42 has a large negative temperature coefficient of resistance and its mounted in thermal contact with one of the conductivity cells. The relative values of the resistors 40, 41 and 42 are selected so that the conductance of the load 36 varies with temperature at the same rate as does the conductance of the liquid being measured. The voltage appearing across the load 36 is proportional to the difference voltage, $e$, and hence to the difference in conductance of the liquids in the cells 30, 32. Therefore only this difference indication is compensated for variations in the temperature of the liquids. This provides a simpler and more accurate method of temperature compensaton than those previously used wherein the output of each individual cell was compensated. This desired compensation of the difference indication may also be accomplished by having the compensation resistor 42 connected across the series combination of resistors 40 and 41 or across the secondary winding 35.

Another embodiment of the difference measuring circuit is illustrated in Fig. 4. Therein a transformer 45 has its primary connected to a suitable electric power source, not shown. A potentiometer 47 is connected across a secondary winding 46 and a second potentiometer 51 is connected across another secondary winding 50. A series combination of a conductivity cell 52 and a resistor 53 is connected between an arm 54 of and one end of the potentiometer 47, and an second series combination of a second conductivity cell 55 and a resistor 56 is also connected between the arm 54 and the end of potentiometer 47. A series combination of a resistor 60, potentiometer 61 and a resistor 62 is connected between a junction point 63 of the cell 52 and resistor 53 and a junction point 64 of the cell 55 and the resistor 56. An arm 65 of the potentiometer 61 is connected to the junction point of the resistors 53 and 56. The voltage, $e$, between the points 63, 64 corresponds to the voltage, $e$, of Fig. 3 and is a measure of the difference in conductance between the cells 52, 55. The potentiometer 61 with the movable arm 65 provides a means for adjusting this voltage to zero when identical solutions are placed in both cells.

A means for measuring the voltage across the points 63, 64 consisting of a comparison voltage source 66 and a voltage difference detector 67 is shown in conjunction with the circuit of Fig. 4. The comparison voltage source 66 includes the secondary winding 50 of the transformer 45 and the potentiometer 51, one end of the winding 50 being connected to the junction point 63. An arm 68 of the potentiometer 51 is also connected to the junction point 63 through a serially-connected resistor 70 and potentiometer 71. The voltage difference detector 67, which may be a simple galvanometer, is connected between the junction point 64 and an arm 72 of the potentiometer 71. The potentiometer 51 or 71 of a particular instrument may be calibrated to read directly in conductivity.

The potentiometers 47 and 51 serve to load the secondary windings of the transformer 45 equally. Their resistance is made small in comparison with that of the other components connected across the secondary windings, therefore the potentiometers carry the major portion of the transformer's secondary current, making the effects of variations in component resistance and cell conductance upon the transformer loading negligible. This feature also causes the phasing of the voltages applied to the conductivity cells and to the voltage comparison circuit to be practically independent of wiring and cell capacitances.

The voltage, $e$, appearing across the points 63, 64 is a function of the voltage, $E$, applied to the conductivity cells and is affected by variations in the electric power source to which the transformer 45 is connected. Such a relation would ordinarily produce undesirable errors in the performance of the measuring circuit unless the electric power source were very closely regulated. However, when the comparison voltage source 66 is operated from the same electric power source that the conductivity cells are, this undesirable error is eliminated, since the output of the comparison voltage circuit will also vary with the fluctuations in the power source. This is in contrast to other methods of measurements which are affected by line voltage variations.

In apparatus of this type, it is usually desired to relate the conductance measurements to the concentration of some ionic compound. Conductance is related to concentration in the following manner:

$$G = \frac{C\lambda}{K}$$

where $C$ is the concentration of the ionic compound, $\lambda$ is the equivalent conductance of the compound, and $K$ is the cell constant. When the two cells contain the same liquid but in different ionic concentrations, the output of the apparatus will be proportional to the difference in concentrations as follows:

$$C_1 - C_2 = \frac{eK}{ER\lambda}$$

In another application both cells may contain the same ionic substance with the same concentration; with one cell also containing another substance. In this case, the output will be proportional to the quantity of the additional substance, $x$, in the one cell, as follows:

$$\lambda_x C_x = \frac{eK}{ER}$$

This latter application is especially useful in any process where the liquid may be treated to either remove or add an ionic substance as it passes from one cell to the next, for the output of the apparatus will depend only upon the amount of the substance added or removed from the solution.

The conductance difference measuring circuit may be adapted to measure the deviation in conductivity of a liquid from a given value of conductivity. This may be accomplished by substituting a sealed cell containing a liquid having the desired conductivity for one of the cells, for example, cell 52 of the circuit of Fig. 4. Alternatively, a resistor having a conductance equal to that of a cell containing a liquid of the desired conductivity may be substituted for the cell. A compensation resistor should be connected in circuit with this resistor and mounted in thermal contact with the liquid in the remaining cell so that the conductance of the combination of the substituted resistor and the compensation resistor will vary with temperature in the same manner as would the conductance of a cell and liquid.

In some applications of the conductance difference measuring circuit, it is desired to maintain a continuous record of the difference in conductance. A modification of the circuit of Fig. 4 is shown in Fig. 5 wherein the difference in conductance may be continuously recorded. A potentiometer 75 is connected between the junction points 63, 64 and the voltage, $e$, which is proportional to the difference in conductance is developed across this potentiometer. The output of a comparison voltage source 76 appears between an arm 77 of a potentiometer 78 and the junction point 63. The arm 77 of the potentiometer 78 and an arm 80 of the potentiometer 75 are each connected to the input of a servoamplifier 81. The output of the servoamplifier drives a motor contained therein which is coupled to the arm 77 and continuously positions the arm 77 so that the voltage between the arms 77, 80 applied to the servoamplifier input is always at a minimum. The output of the servoamplifier 81 is connected to a recorder 82, thereby providing a continuous record of the voltage between the points 63, 64 and, hence, of the difference in conductivity of liquids in cells 52 and 55.

The comparison voltage source 76 of Fig. 5 is similar in construction and operation to the comparison voltage source 66 of Fig. 4. The potentiometer 51 is connected across the secondary winding 50 and one end of the secondary winding is connected to the junction point 63. The arm 68 of the potentiometer 51 is also connected to the junction point 63 through a parallel-series combination consisting of a resistor 84, a compensation resistor 85, a resistor 86, a potentiometer 87, a resistor 88 and the potentiometer 78. The compensation resistor 85 is identical in design and function to the compensation resistor 42 of Fig. 3, providing an adjustment in the voltage applied to the servoamplifier input in relation to the variations in conductance of the liquids in the cells due to variations in the temperature of the liquids. The potentiometer 87 and the resistor 88 provide a means for calibrating the potentiometer 78, that is, a means for adjusting the voltage across the potentiometer 78 to give the desired sensitivity. This calibration circuit provides a wide range of adjustment of the current through the potentiometer 78 without appreciably affecting the total impedance of the comparison voltage source 76, thereby preventing the calibration adjustment from affecting the temperature compensation action of the circuit.

The potentiometer 75 provides for range selection without changing the maximum voltage output to the servoamplifier 81, the latter serving as the voltage difference detector. Thus, the gain and signal levels in the difference detector may be set at the optimum and will be the same for all range selections, avoiding the necessity of adjusting the servoamplifier gain each time the range is changed.

An alternative embodiment of the continuous recording circuit of Fig. 5 is illustrated in Fig. 6. Therein the secondary winding 50 of the transformer 45 is connected across an impedance bridge 91 through resistors 92 and 93 and a temperature compensation resistor 94. The junction point 63 is connected to ground and the arm 80 of the range adjustment potentiometer 75 is connected to the "ground" corner of the impedance bridge 91. The opposite corner of the impedance bridge is connected to the servoamplifier 81, the output of the servoamplifier being connected to the recorder 82. In this embodiment, the impedance bridge 91 serves as the comparison voltage source and it is compensated for variations in the temperature of the liquids being measured in a manner similar to that in the embodiment of Fig. 5. The servoamplifier 81 drives a motor contained therein which controls a variable capacitor 95 of the bridge 91 to maintain the input to the servoamplifier at a minimum. In this embodiment, the calibration control consists of a variable resistor 96 connected between the junction points 63, 64, thus providing a calibration adjustment which does not affect the temperature compensation circuit.

Although several exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In an apparatus for measuring the conductance of a liquid, the combination of: a conductivity cell containing the liquid to be measured, said cell having two electrodes; an electric power source of known potential connected across said electrodes; a resistor; and circuit means serially connecting said resistor in circuit intermediate said cell and said source, the ratio of the conductance of said resistor to the conductance of said cell being greater than twenty to one, said conductance of said liquid being substantially directly proportional to the voltage across said resistor.

2. In an apparatus for measuring the conductance of a liquid, the combination of: a conductivity cell containing the liquid to be measured, said cell having two electrodes; an electric power source of known potential connected across said electrodes; a transformer having a primary and a secondary, said primary being serially connected in circuit intermediate said cell and said source; and a load connected across said secondary, the impedance of said transformer and load as measured across said primary being less than one twentieth the impedance of said cell, said conductance of said liquid in said cell being substantially directly proportional to the current in said primary.

3. An apparatus as defined in claim 2 including rectifying means connected intermediate said secondary and said load.

4. In an apparatus for measuring the difference in conductance between a first liquid and a second liquid, the combination of: an electric power source of known potential; a first circuit consisting of a serially connected first load means and first conductivity cell containing said first liquid; a second circuit consisting of a serially connected second load means and second conductivity cell containing said second liquid; means for connecting said first circuit and said second circuit to said power source in parallel, the difference voltage between the junction point of said first cell and said first load means and the junction point of said second cell and said second load means being substantially directly proportional to said difference in conductance; and control means interconnected with at least one of said circuits, said control means being capable of varying the voltage across at least one of said load means to make said difference voltage zero when identical liquids are in each of said cells.

5. An apparatus as defined in claim 4 including transformer means having a first primary, a second primary, and a secondary, said first primary being said first load means and said second primary being said second load means.

6. An apparatus as defined in claim 5 including a rectifying means connected to said secondary, said rectifying means producing a direct current voltage proportional to said difference in conductance.

7. An apparatus as defined in claim 6 including temperature compensation means connected in circuit with said secondary and said rectifying means and mounted in thermal contact with one of said cells, said compensation means varying said direct current voltage as a function of the temperature of the liquid in said last mentioned cell.

8. In an apparatus for measuring the difference in conductance between a first liquid and a second liquid, the combination of: an electric power source of known potential; a first circuit consisting of a serially connected first load means and first conductivity cell containing said first liquid, said first circuit being connected across said power source; a second circuit consisting of a serially connected second load means and second conductivity cell containing said second liquid, said second circuit being connected across said power source, the difference voltage between the junction point of said first cell and said first load means and the junction point of said second cell and said second load means being substantially directly proportional to said difference in conductance; control means interconnected with at least one of said circuits, said control means being capable of varying the voltage across at least one of said load means to make said difference voltage zero when identical liquids are in each of said cells; and voltage measuring means connected between said junction points, said measuring means including a comparison voltage source, a voltage difference detector and circuit means interconnecting said detector with said comparison voltage source and said junction points.

9. An apparatus as defined in claim 8 in which said electric power source and said comparison voltage source are energized by the same power supply.

10. An apparatus as defined in claim 8 in which said voltage difference detector includes a servo rebalance unit for varying said comparison voltage source as a function of the difference detected.

11. An apparatus as defined in claim 8 in which said voltage measuring means includes compensation means connected in circuit with said measuring means to vary the result of said measuring means as a function of the temperature of one of said liquids, said compensation means being mounted in thermal contact with said one liquid.

12. An apparatus as defined in claim 11 in which said compensation means comprises an impedance element the resistance of which decreases as its temperature increases, said element being mounted in thermal contact with one of said cells.

13. In an apparatus for measuring the deviation in conductance of a liquid from a given value, the combination of: an electric power source; a first circuit consisting of a serially connected first load means and first conductivity cell containing said liquid, said first circuit being connected across said power source; a second circuit consisting of a serially connected second load means and second conductivity cell, said second cell being sealed and containing a reference liquid having a conductance of said given value, said second circuit being connected across said power source, the ratio of the conductance of each of said load means to the conductance of the corresponding cell being greater than twenty to one, the difference voltage between the junction point of said first cell and said first load means and the junction point of said second cell and said second load means being substantially directly proportional to said deviation; and control means interconnected with at least one of said circuits, said control means being capable of varying the voltage across at least one of said load means to make said difference voltage zero when identical liquids are in each of said cells.

14. In an apparatus for measuring the deviation in conductance of a liquid from a given value, the combination of: an electric power source; a first circuit consisting of a serially connected first load means and first conductivity cell containing said liquid, said first circuit being connected across said power source; a second circuit consisting of a serially connected second load means and resistor, the conductance of said resistor being equivalent to said given value, said second circuit being connected across said power source, the ratio of the conductance of each of said load means to the corresponding cell and resistor being greater than twenty to one; compensation means connected in circuit with said resistor to vary the conductance of said resistor as a function of the temperature of said liquid, said compensation means being mounted in thermal contact with said liquid, the difference voltage between the junction point of said first cell and said first load means and the junction point of said resistor and said second load means being substantially directly proportional to said deviation; and control means interconnected with at least one of said circuits, said control means being capable of varying the voltage across at least one of said load means to make said difference voltage zero.

15. In an apparatus for measuring the difference in conductance between a first liquid and a second liquid, the combination of: an electric power source of known potential; a first conductivity cell containing the first liquid; a second conductivity cell containing the second liquid; load means, the conductance of said load means being at least twenty times greater than the conductance of said cells; circuit means for connecting said power source to said load means in series with each of said cells; and voltage indicating means coupled to said load means.

16. In an apparatus for measuring the difference in conductance between a first liquid and a second liquid, the combination of: an electric power source of known potential; a first circuit consisting of a serially connected first load means and first conductivity cell containing said first liquid, said first circuit being connected across said power source; a second circuit consisting of a serially connected second load means and second conductivity cell containing said second liquid, said second circuit being connected across said power source, the ratio of the conductance of the load means to the conductance of the cell in each of said circuits being greater than twenty to one, the difference voltage between the junction point of said first cell and said first load means and the junction point of said second cell and said second load means being substantially directly proportional to said difference in conductance; and control means interconnected with at least one of said circuits, said control means being capable of varying the voltage across at least one of said load means to make said difference voltage zero when identical liquids are in each of said cells.

References Cited in the file of this patent

UNITED STATES PATENTS

| | | |
|---|---|---|
| 2,224,382 | Douty | Dec. 10, 1940 |
| 2,370,609 | Wilson et al. | Feb. 27, 1945 |
| 2,565,501 | Ingram | Aug. 28, 1951 |
| 2,599,413 | Reichertz | June 3, 1952 |

FOREIGN PATENTS

| | | |
|---|---|---|
| 675,030 | Great Britain | July 2, 1952 |